(12) United States Patent
Haferkorn et al.

(10) Patent No.: US 9,910,665 B2
(45) Date of Patent: *Mar. 6, 2018

(54) SIMULTANEOUS OPERATION OF MULTIPLE VERSIONS OF AN APPLICATION USING BIDIRECTIONAL SYNCHRONIZATION AND SEPARATED READ WRITE CHANNELS

(71) Applicants: Andre Haferkorn, Heidelberg (DE); Andrey Engelko, Bad Schonborn (DE)

(72) Inventors: Andre Haferkorn, Heidelberg (DE); Andrey Engelko, Bad Schonborn (DE)

(73) Assignee: SAP SE, Walldorf (DE)

( * ) Notice: Subject to any disclaimer, the term of this patent is extended or adjusted under 35 U.S.C. 154(b) by 390 days.

This patent is subject to a terminal disclaimer.

(21) Appl. No.: 14/622,174

(22) Filed: Feb. 13, 2015

(65) Prior Publication Data
US 2016/0239523 A1 Aug. 18, 2016

(51) Int. Cl.
G06F 7/00 (2006.01)
G06F 17/00 (2006.01)
G06F 9/445 (2018.01)
G06F 17/30 (2006.01)

(52) U.S. Cl.
CPC .......... G06F 8/67 (2013.01); G06F 17/30297 (2013.01)

(58) Field of Classification Search
CPC ......... G06F 17/30292; G06F 17/30309; G06F 17/30345; G06F 8/67
USPC ................................................ 707/803, 638
See application file for complete search history.

(56) References Cited

U.S. PATENT DOCUMENTS

| | | | | |
|---|---|---|---|---|
| 2005/0050068 A1* | 3/2005 | Vaschillo | .......... | G06F 17/30569 |
| 2006/0123010 A1* | 6/2006 | Landry | ............ | G06F 17/30575 |
| 2014/0095432 A1* | 4/2014 | Trumbull | ................ | G06F 17/30 707/610 |
| 2014/0101644 A1* | 4/2014 | Buzaski | ............ | G06F 17/30174 717/168 |
| 2014/0108269 A1* | 4/2014 | Meijler | ................ | G06Q 10/103 705/301 |
| 2015/0134900 A1* | 5/2015 | Lin | ......................... | G06F 17/30 711/113 |
| 2015/0234935 A1* | 8/2015 | Gu | .................... | G06F 17/30958 707/756 |

* cited by examiner

*Primary Examiner* — Binh V Ho
(74) *Attorney, Agent, or Firm* — Mintz Levin Cohn Ferris Glovsky and Popeo, P.C.

(57) ABSTRACT

An upgrade of a first version of a database application to a second version of a database application that both have a same data schema is initiated. The first database application has a first access schema such that at least one table in the data schema is linked to the first access schema. The second version of the database application has a second access schema such that at least one table in the data schema is linked to the second access schema. The first access schema differs from the second access schema. Subsequently, concurrent access is provided for each access schema to at least one database table in the data schema to both the first version of the database application and the second version of the database application. The concurrent access is enabled by using separate read and write channels. Related apparatus, systems, techniques and articles are also described.

17 Claims, 9 Drawing Sheets

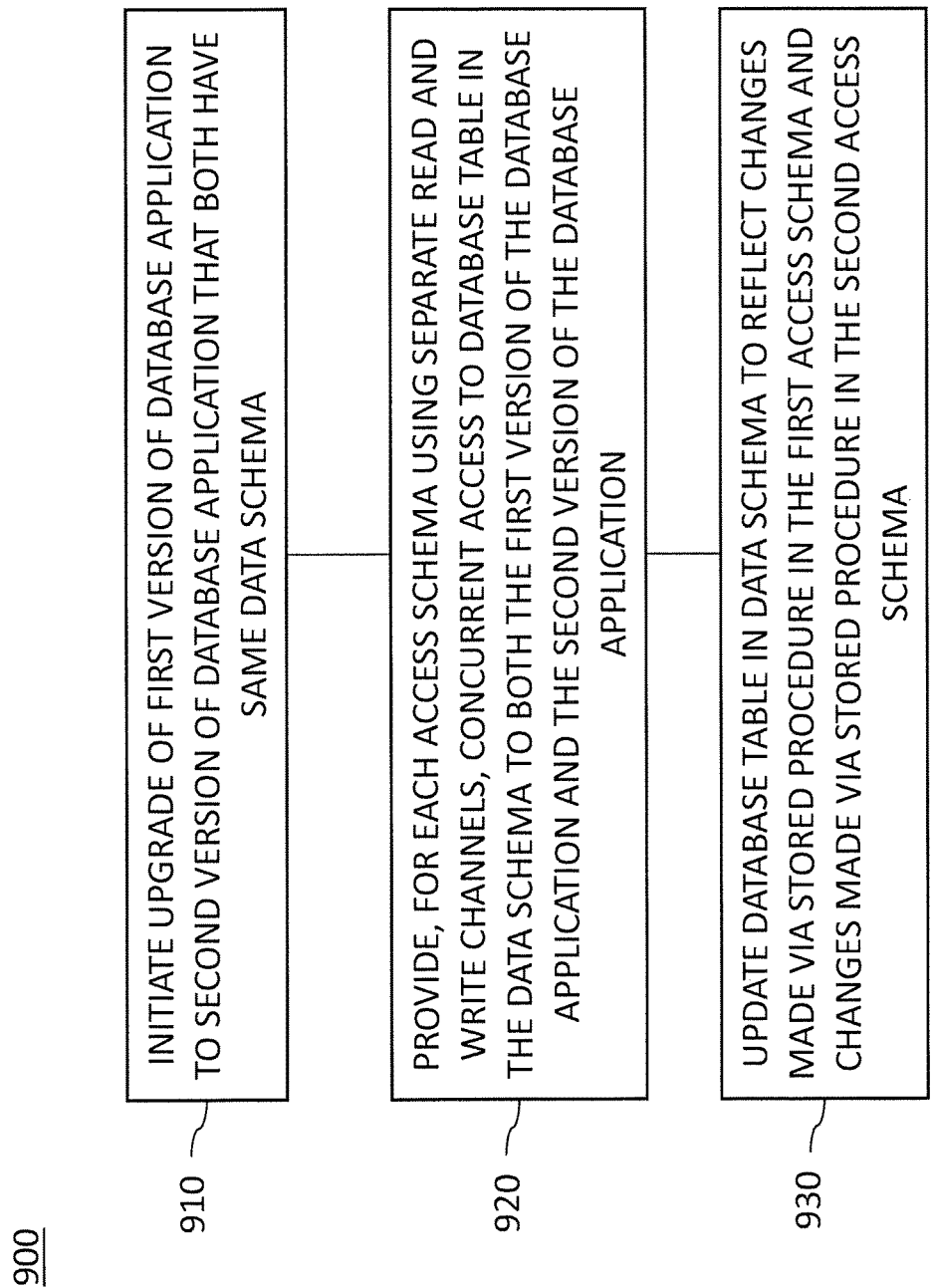

SIMULTANEOUS OPERATION OF MULTIPLE VERSIONS OF AN APPLICATION USING BIDIRECTIONAL SYNCHRONIZATION AND SEPARATED READ WRITE CHANNELS

TECHNICAL FIELD

The subject matter described herein relates to the use of a multi-database-schema-approach in connection with the zero downtime maintenance/upgrade of database applications that uses separate read and write channels.

BACKGROUND

Deployment of maintenance packages to computing platforms often requires downtime of such platforms. At the beginning of downtime, a backup is created and this backup serves as a fallback option, in case the upgrade fails. Advancements in technology have enabled for reduced, and in some cases, minimal downtime upgrades. With such arrangements, upgrades run in parallel to a production system within the same database for the complete duration of the upgrade. The upgrade procedure creates clones of the tables, which are changed by the upgrade and runs database triggers to replicate data from production to the upgrade copy of the tables.

SUMMARY

An upgrade of a first version of a database application to a second version of a database application that both have a same data schema is initiated. The first database application has a first access schema such that at least one table in the data schema is linked to the first access schema. The second version of the database application has a second access schema such that at least one table in the data schema is linked to the second access schema. The first access schema differs from the second access schema. Subsequently, concurrent access to a database table in the data schema to both the first version of the database application and the second version of the database application is provided for each access schema using separate read and write channels.

The at least one database table in the data schema can be updated to reflect changes made via at least one stored procedure in the first access schema and changes made via at least one stored procedure in the second access schema. In some implementations, the database application is executed using an in-memory database system. The read and write channels are accessed by using view and stored procedures.

The updating the at least one database table in the data schema by using bi-directional transformation.

The updating the at least one database table in the data schema includes synchronization and transformation of data between the first version of the database application and the second version of the database application.

The database application can be executed using an in-memory database system such as a column-oriented database system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, with the current subject matter, new software for database can be deployed in parallel to old software while, at the same time, as much persistency as possible is reused. Such an arrangement provides for an in-place upgrade in which, if the upgrade writes to persistency, either due to content delivery or due to data migration activities, the data for the respective database tables is duplicated. This approach minimizes the additional memory consumption during the upgrade procedure as compared to conventional techniques for upgrading database software with little, if any, downtime.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 9 is a process flow diagram illustrating a process for zero downtime using multiple schemas.

Like reference symbols in the various drawings indicate like elements.

DETAILED DESCRIPTION

The current subject matter enables revocation of zero downtime upgrades by providing a procedure on the same level as the upgrade deploy tool, which executes steps, revoking actions of the initial deployment on a database table level. Various types of zero downtime maintenance/ upgrade procedures can be utilized such as that described in U.S. Pat. App. Pub. No. 20130238555 entitled: "Aliases for accessing shared tables during provision of continuous access during application upgrade" and in U.S. Pat. App. Pub. No. 20130238868 "Using temporary system to provide continuous access during application upgrade", and U.S. patent application Ser. No. 14/576,558, filed on Dec. 19, 2014 and entitled: "Zero Downtime Upgrade of Database Applications Using Triggers and Calculated Fields" the contents of all of which are hereby fully incorporated by reference. With zero downtime maintenance (ZDM), sometimes referred to as zero downtime upgrades, if a table is populated during the upgrade, the upgrade procedure creates a copy of the table, installs a database trigger to replicate all changes done by production from the production table to the upgrade's copy. At the end of the upgrade, the access of production is switched to the target table. For the revoke procedure, the copy of the table created for the upgrade can be dropped and usage can remain with the original table. Similar approaches can be defined for all other table categories.

Figure 1:
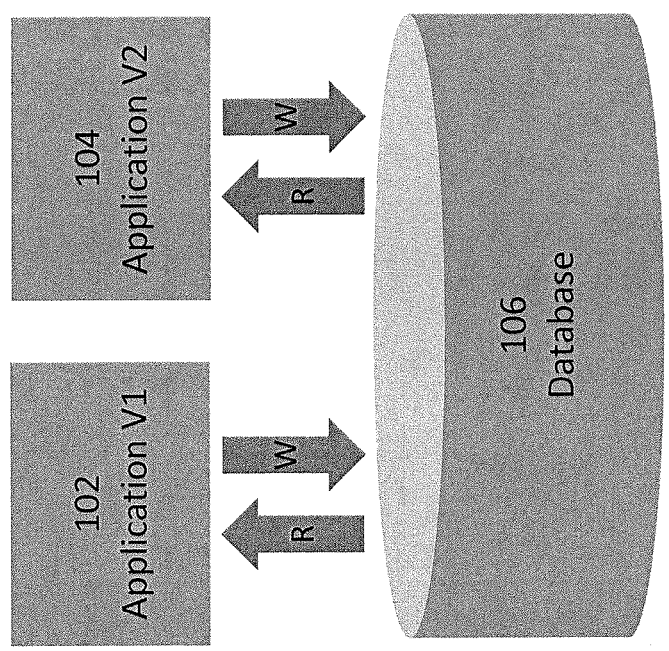
FIG. 1 is a system diagram illustrating a sample architecture of a zero downtime maintenance application.

FIG. 1 is a diagram 100 illustrating a sample architecture of a zero downtime maintenance (ZDM) application. Diagram 100 includes two versions of application software 102 and 104 and a database 106. Each version of application software may access database 106 by separate read and write channels. The read and write channel may be split using the pattern Command Query Responsibility Segregation (CQRS). The database 106 may be an in-memory database, such as the HANA platform offered by SAP SE. The read channel may use views which are read-only. The application may easily switch to read-only mode by deactivating the write channel.

Figure 2:
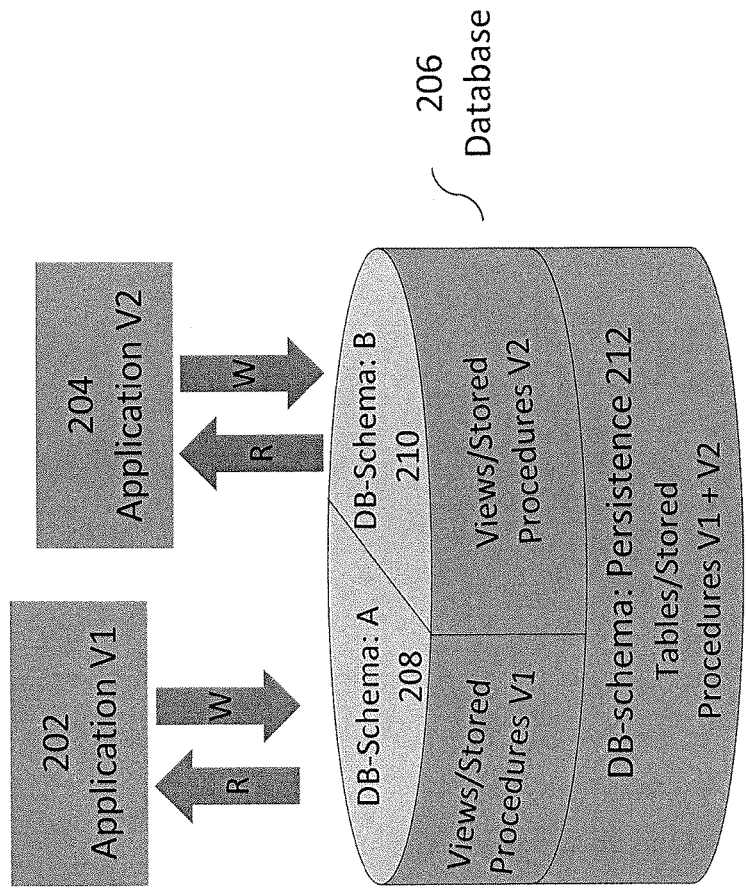
FIG. 2 is a system diagram illustrating a sample architecture of a zero downtime maintenance application using multiple schemas.

FIG. 2 is a diagram 200 illustrating a sample architecture of a zero downtime maintenance (ZDM) application using multiple schemas. Database 206 may be divided into three schemas: DB-Schema A 208, DB-Schema B 210, and DB-Schema Persistence 212. Application software V1 202 may access the database 206 through DB-Schema A 208. DB-Schema A 208 includes views and stored procedures (i.e., subroutines available to applications that access a relational database system, etc.), for software application V1 202. Application software V2 204 may access the database 206 through DB-Schema B 210. DB-Schema B 210 includes views and stored procedures for software application V2 204. Database 206 includes an additional database schema DB-schema Persistence 212 that contains the actual data. DB-Schema Persistence 212 includes tables and stored procedures for both application software V1 202 and application software V2 204. Database objects for the two versions of application software 202 and 204 may have the same name. There can be no data cloning for structural identical tables of the two versions of application software. The database 206 may use a non-relational generic data store.

Figure 3:
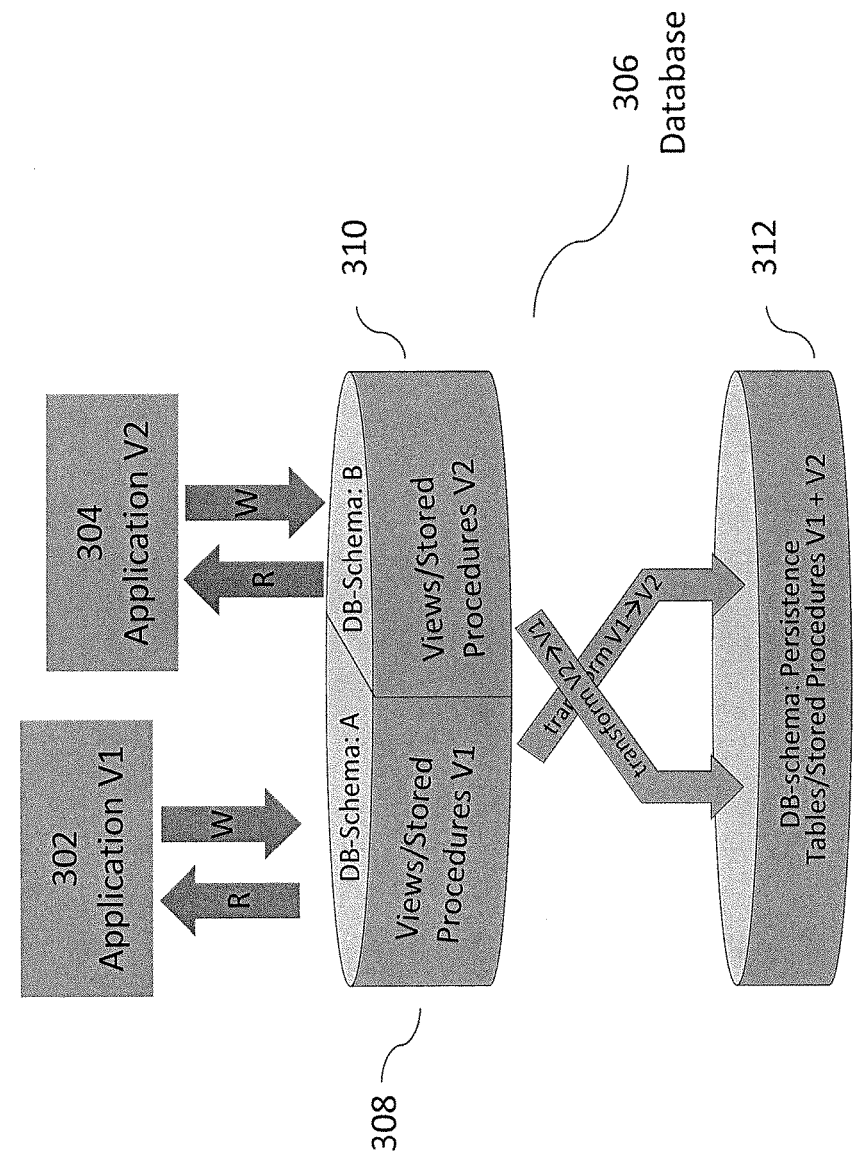
FIG. 3 is a system diagram illustrating a zero downtime maintenance application using bi-directional transformation.

FIG. 3 is a diagram 300 illustrating a zero downtime maintenance (ZDM) application using bi-directional transformation. Application software V1 302 may access the database 306 through DB-Schema A 308. Application software V2 304 may access the database 306 through DB-Schema B 310. Bi-directional transformation is used to keep the data of V1 and V2 in sync. For example, application software V1 302 may use write operation to make a change and the change has to be replicated to the other version instantly. The change of V1 is converted to the format of V2 and stored in DB-Schema Persistence 312.

Figure 4:
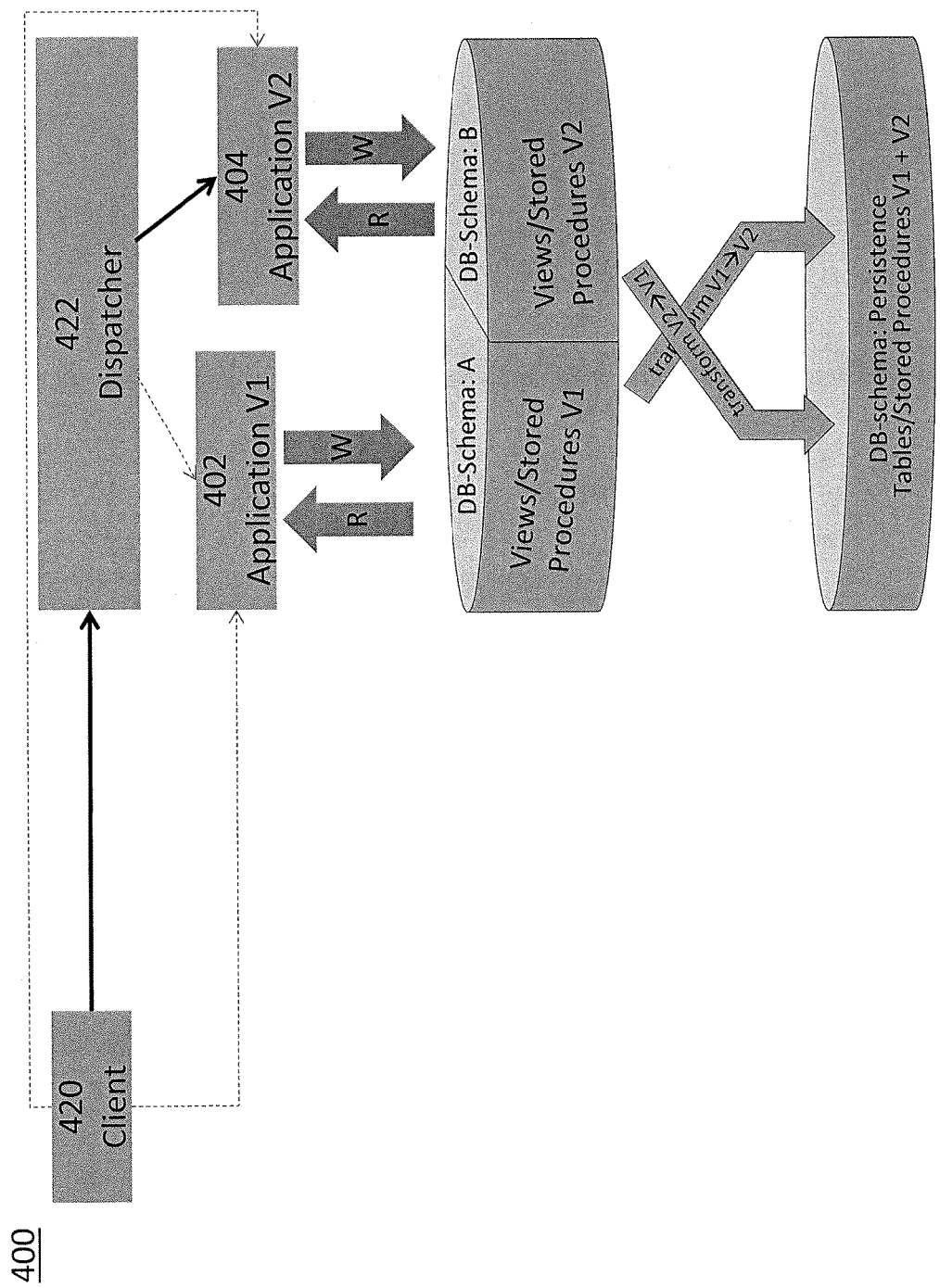
FIG. 4 is a system diagram illustrating a sample zero downtime maintenance application.

FIG. 4 is a diagram 400 illustrating a sample zero downtime maintenance (ZDM) application. Diagram 400 includes client 420, dispatcher 422, and application software V1 402, and application software V2 404, as referenced in 302 and 304 in FIG. 3. Client 420 may access application software V1 402 and application software V2 404 directly. In some embodiments, client 420 may access the active version by sending a request to a dispatcher 422. The request may include a standard URL. The dispatch 422 may redirect a client request to the active version. This ensures that access to application software V1 402 and application software V2 404 is always possible.

Figure 5:
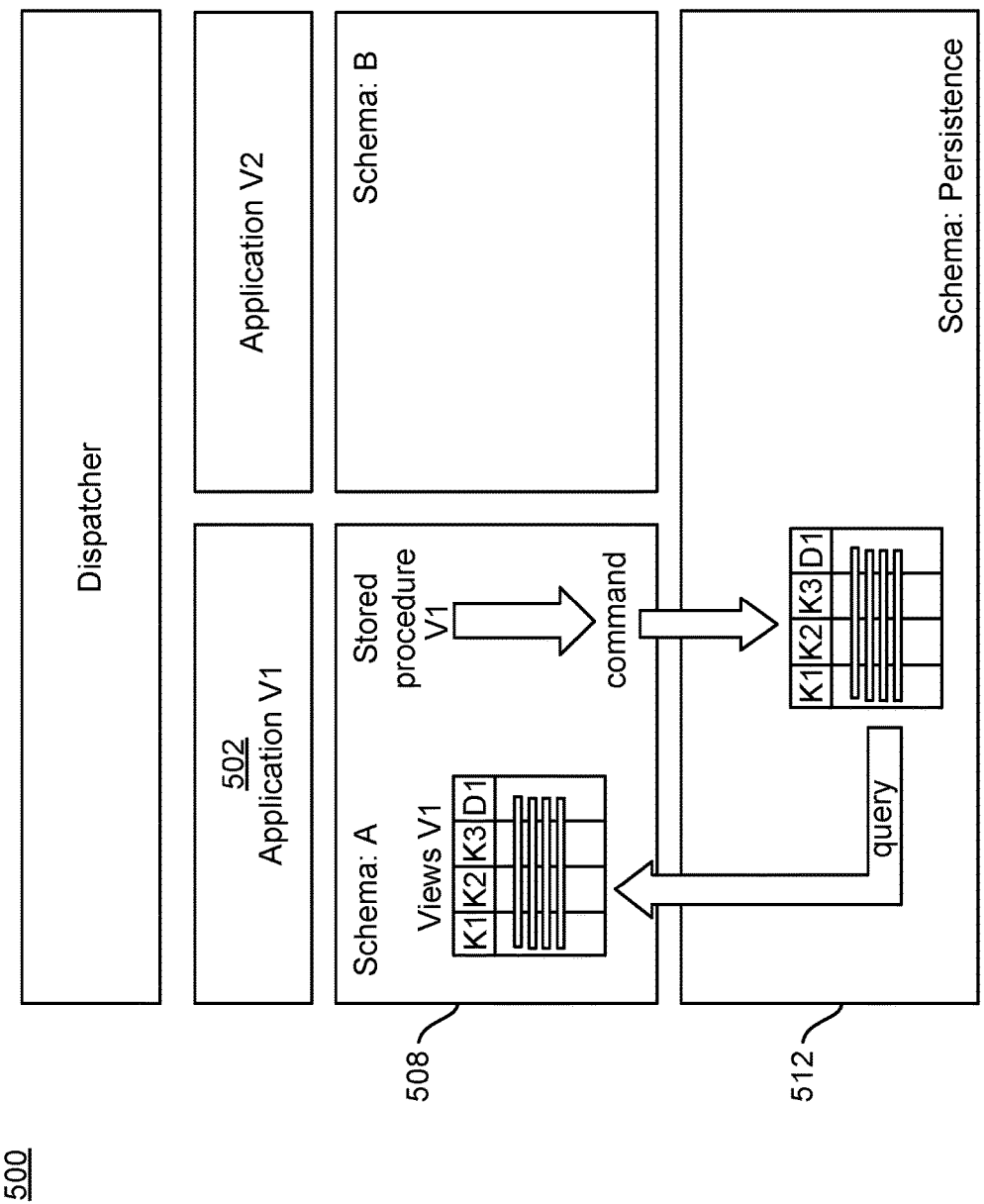
FIG. 5 is a system diagram illustrating read and write channel for a zero downtime maintenance (ZDM) application.

FIG. 5 is a diagram 500 illustrating read and write channel for a zero downtime maintenance (ZDM) application. Application software V1 502 may use the read and write channels (shown in FIG. 1) to access the database. In some embodiments, application software V1 502 uses stored procedure V1 to write data into DB-Schema Persistence 512. In some embodiments, application software V1 502 uses view V1 to query data from DB-Schema Persistence 512.

Figure 6:
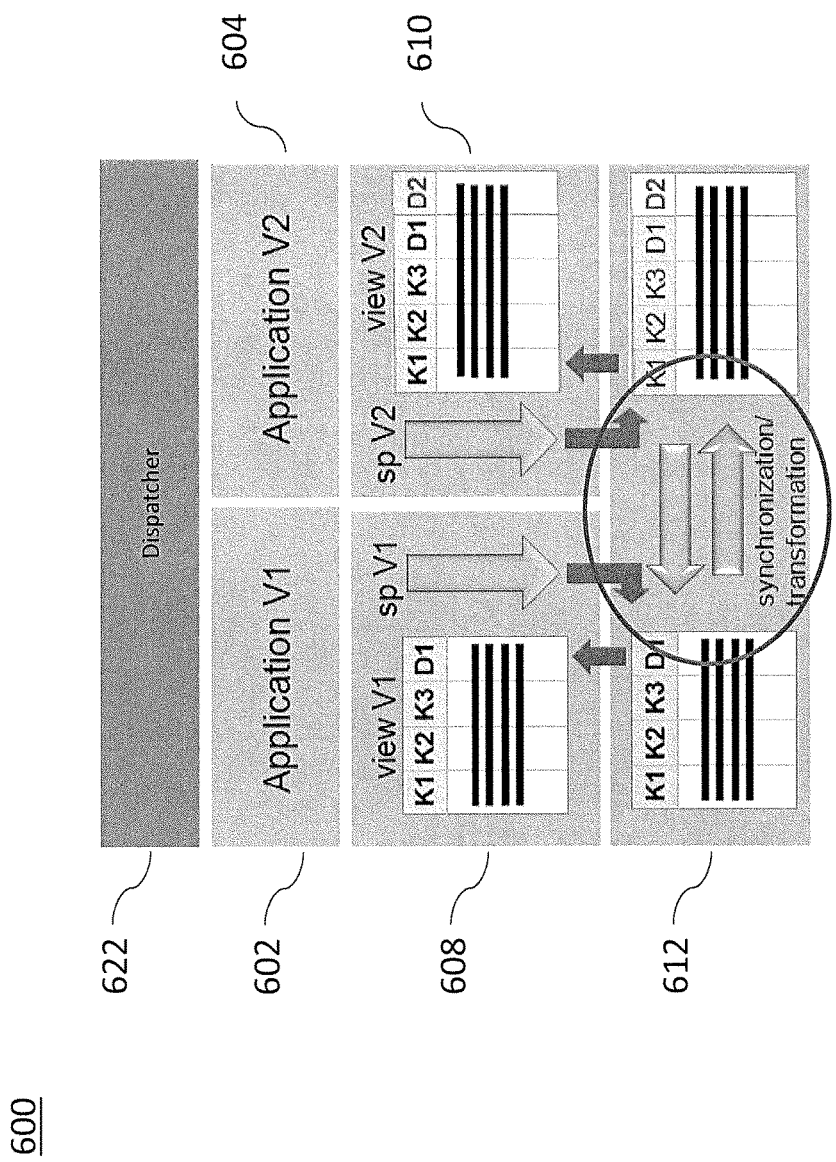
FIG. 6 is a system diagram illustrating data synchronization and transformation in a zero downtime maintenance application.

FIG. 6 is a diagram 600 illustrating data synchronization and transformation in a zero downtime maintenance application. A dispatcher 622 may access application software V1 602 and application software V2 604 as shown in FIG. 3. In a first phase, data of V1 is cloned and transformed at application software V1 602 and data of V2 is cloned and transformed at application software V2 604. In some variations, the cloned data can be performed using a log table. In a second phase, the clone data of V1 and the clone data of V2 are sent to database 612 without affecting view V1 at DB-Schema A 608 or view V2 at DB-Schema B 610. In a third phase, the cloned data of V1 and the cloned data of V2 are replicated and transformed bi-directionally between V1 and V2 at database 612. Application software V1 602 and application software V2 604 may run in parallel.

Figure 7:
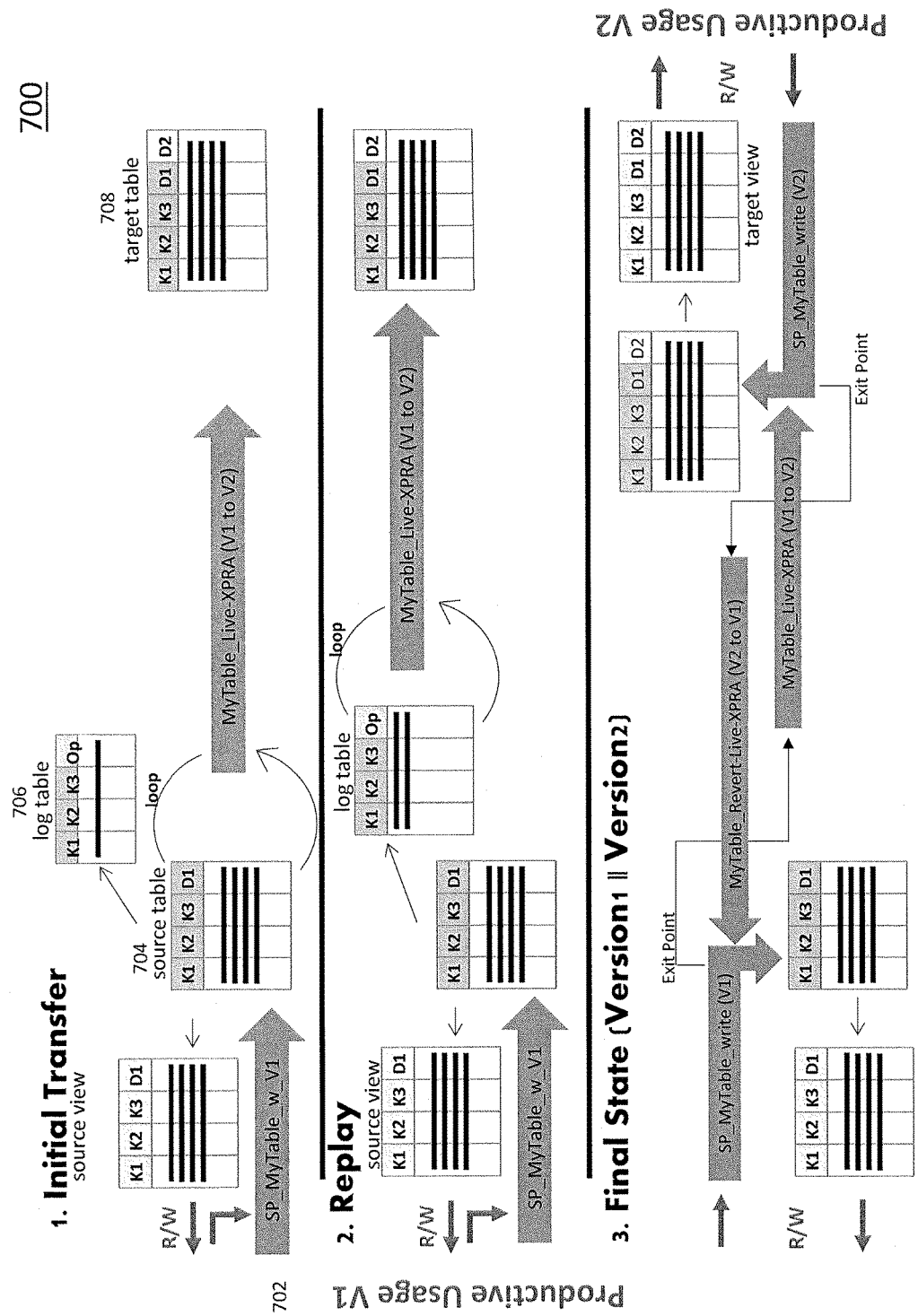
FIG. 7 is a diagram illustrating data synchronization and transformation in a zero downtime maintenance application.

FIG. 7 illustrates a diagram 700 illustrating the process of data synchronization and transformation at the database. In initial transfer, software application V1 702 initiates a write operation on V1. The data is cloned and stored in log table 706. Source table 704 remains the same so that view operation would remain the same during the write operation. In replay, the source table 704 and the target table 708 remain the same while the log table 706 keeps the cloned data. In the final state, the log table 706 is replicated and transformed into the target table 708 using exit points.

Exit points are used similar to database triggers but exit points are used when a stored procedure is called. Exit points have been introduced so that an event handler would react on a specific event and this specific event could be raised anywhere within the code. There are two points within such a prepared stored procedure: at the very beginning (BEFORE) and at the very end (AFTER). There are two kinds of exit point procedures used in the ZDM application: procedures for change recording (logging) and for synchronization. The logging or synchronization may be switched on by adding exit point procedures to the table. The logging or synchronization may be switched off by removing exit point procedures to the table.

Figure 8:
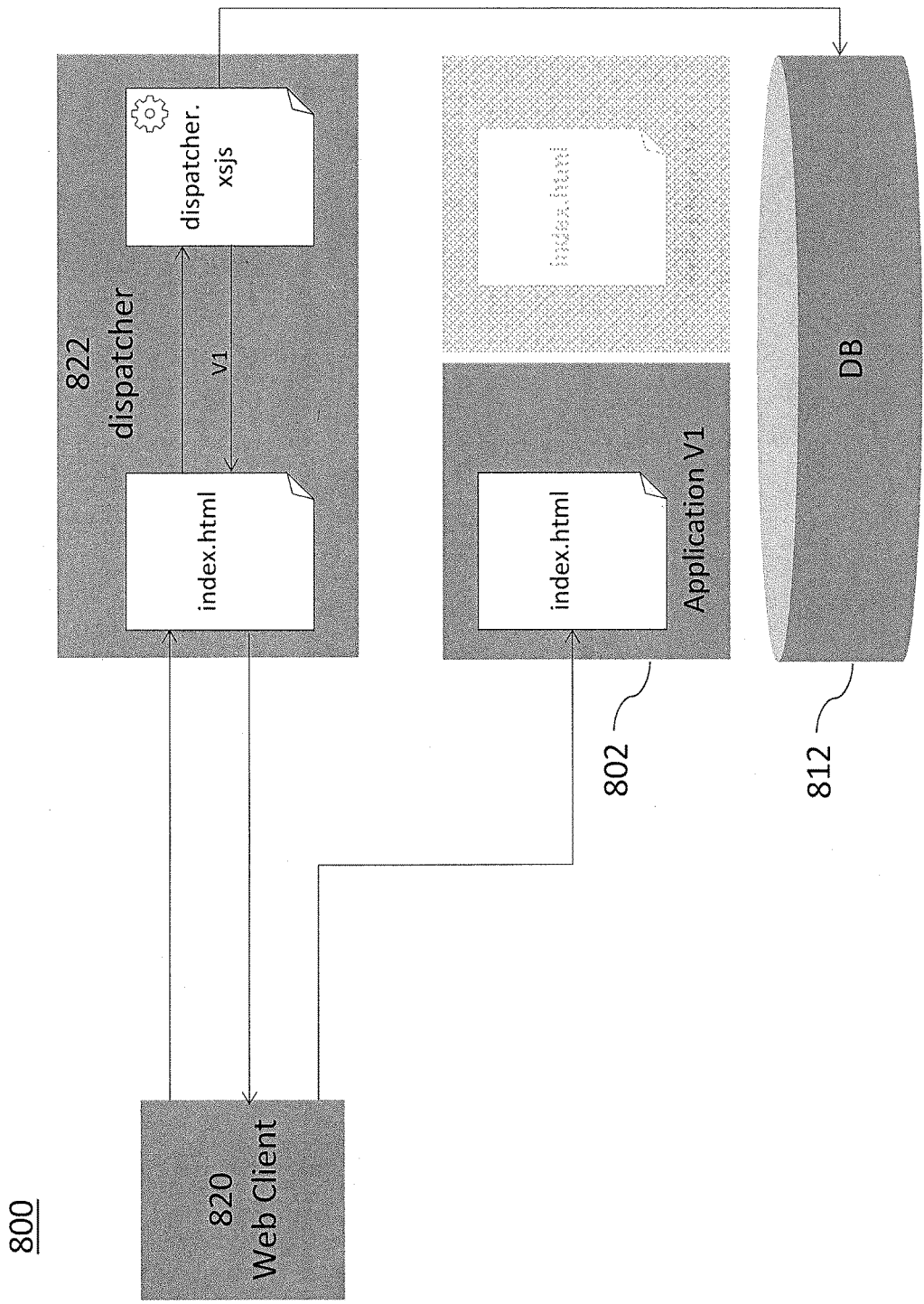
FIG. 8 is a system diagram illustrating the process of redirecting a client to an active version of software application in a zero downtime maintenance application.

FIG. 8 illustrates a diagram 700 illustrating the process of redirecting a web client to the active version of application software. A web client 820 may send a request to a dispatcher 822 requesting an active version of a software application. The dispatcher 822 may query a database 812 and get a response with the active version of the software application. The dispatcher 822 then sends a redirect message including the active version of the software application to the web client 820. The web client 820 then sends a request to the software application V1 802 based on the received redirection message from the dispatcher 822.

FIG. 9 is a process flow diagram 900 in which, at 910, an upgrade of a first version of a database application to a second version of a database application that both have a same data schema is initiated. The first database application has a first access schema such that at least one table in the data schema is linked to the first access schema. The second version of the database application has a second access schema such that at least one table in the data schema is linked to the second access schema. The first access schema differs from the second access schema. Subsequently, at 920, concurrent access is provided for each access schema to at least one database table in the data schema to both the first version of the database application and the second version of the database application. The concurrent access is enabled by using a separate read and write channels. Further, optionally, at 930, the at least one database table in the data schema is updated to reflect changes made via at least one stored procedure in the first access schema and changes made via at least one stored procedure in the second access schema.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:

initiating an upgrade of a first version of a database application to a second version of a database application that both have a same data schema, the first database application having a first access schema such that at least one table in the data schema is linked to the first access schema, the second version of the database application having a second access schema such that at least one database table in the data schema is linked to the second access schema, the first access schema differing from the second access schema;

providing, for each access schema using separate read and write channels, concurrent access to at least one database table in the data schema to both the first version of the database application and the second version of the database application; and updating the at least one database table in the data schema, the updating comprising:

cloning data of the first version and data of the second version;

transmitting cloned data of the first version from the first access schema to the data schema;

transmitting cloned data of the second version from the second access schema to the data schema;

replicating and bi-directionally transforming the cloned data of the first version and second version between the first version of the database application and the second version of the database application at the at least one database table in the data schema; and wherein replicating and bi-directionally transforming comprises updating the at least one database table in the data schema to reflect changes made via at least one stored procedure in the first access schema and changes made via at least one stored procedure in the second access schema.

2. The method of claim 1, wherein the database application is executed using an in-memory database system.

3. The method of claim 1, wherein the read and write channels includes using view and stored procedures.

4. The method of claim 1, wherein transmitting cloned data of the first version comprises transmitting without affecting a view of the first version in the first access schema.

5. The method of claim 1, wherein transmitting cloned data of the second version comprises transmitting without affecting a view of the second version in the second access schema.

6. The method of claim 1, wherein the database comprises an in-memory column-oriented database.

7. A non-transitory computer program product storing instructions which, when executed by at least one hardware data processors, result in operations comprising:

initiating an upgrade of a first version of a database application to a second version of a database application that both have a same data schema, the first database application having a first access schema such that at least one table in the data schema is linked to the first access schema, the second version of the database application having a second access schema such that at least one database table in the data schema is linked to the second access schema, the first access schema differing from the second access schema; and providing, for each access schema using separate read and write channels, concurrent access to at least one database table in the data schema to both the first version of the database application and the second version of the database application; and updating the at least one database table in the data schema, the updating comprising: cloning data of the first version and data of the second version;

transmitting cloned data of the first version from the first access schema to the data schema;

transmitting cloned data of the second version from the second access schema to the data schema;

replicating and bi-directionally transforming the cloned data of the first version and second version between the first version of the database application and the second version of the database application at the at least one database table in the data schema; and wherein replicating and bi-directionally transforming comprises updating the at least one database table in the data schema to reflect changes made via at least one stored procedure in the first access schema and changes made via at least one stored procedure in the second access schema.

8. The non-transitory computer program product of claim 7, wherein the database application is executed using an in-memory database system.

9. The non-transitory computer program product of claim 7, wherein the read and write channels includes using view and stored procedures.

10. The non-transitory computer program product of claim 7, wherein transmitting cloned data of the first version comprises transmitting without affecting a view of the first version in the first access schema.

11. The non-transitory computer program product of claim 7, wherein transmitting cloned data of the second version comprises transmitting without affecting a view of the second version in the second access schema.

12. The non-transitory computer program product of claim 7, wherein the database comprises an in-memory column-oriented database.

13. A system comprising:

at least one hardware data processor; and memory storing instructions which, when executed by the at least one data processor, result in operations comprising:

initiating an upgrade of a first version of a database application to a second version of a database application that both have a same data schema, the first database application having a first access schema such that at least one table in the data schema is linked to the first access schema, the second version of the database application having a second access schema such that at least one database table in the data schema is linked to the second access schema, the first access schema differing from the second access schema; and providing, for each access schema using separate read and write channels, concurrent access to at least one database table in the data schema to both the first version of the database application and the second version of the database application; and updating the at least one database table in the data schema, the updating comprising:

cloning data of the first version and data of the second version;

transmitting cloned data of the first version from the first access schema to the data schema;

transmitting cloned data of the second version from the second access schema to the data schema;

replicating and bi-directionally transforming the cloned data of the first version and second version between the first version of the database application and the second version of the database application at the at least one database table in the data schema; and wherein replicating and bi-directionally transforming comprises updating the at least one database table in the data schema to reflect changes made via at least one stored procedure in the first access schema and changes made via at least one stored procedure in the second access schema.

14. The system of claim 13, wherein the database application is executed using an in-memory database system.

15. The system of claim 13, wherein the read and write channels includes using view and stored procedures.

16. The system of claim 13, wherein transmitting cloned data of the first version comprises transmitting without affecting a view of the first version in the first access schema.

17. The system of claim 13, wherein transmitting cloned data of the second version comprises transmitting without affecting a view of the second version in the second access schema.

* * * * *